United States Patent
Zhang et al.

(10) Patent No.: US 10,437,258 B2
(45) Date of Patent: Oct. 8, 2019

(54) AUTOMATIC DRIVE CONTROL SYSTEM AND METHOD, AND VEHICLE

(71) Applicant: BOE TECHNOLOGY GROUP CO., LTD., Beijing (CN)

(72) Inventors: Bo Zhang, Beijing (CN); Wenbo Li, Beijing (CN); Hongli Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/550,199

(22) PCT Filed: Feb. 28, 2017

(86) PCT No.: PCT/CN2017/075087
§ 371 (c)(1),
(2) Date: Aug. 10, 2017

(87) PCT Pub. No.: WO2017/215288
PCT Pub. Date: Dec. 21, 2017

(65) Prior Publication Data
US 2019/0101932 A1    Apr. 4, 2019

(30) Foreign Application Priority Data

Jun. 17, 2016 (CN) .......................... 2016 1 0438627

(51) Int. Cl.
*B60W 30/16* (2012.01)
*G05D 1/02* (2006.01)
(Continued)

(52) U.S. Cl.
CPC ........... *G05D 1/0293* (2013.01); *B60W 30/09* (2013.01); *B60W 30/16* (2013.01); *B60W 40/04* (2013.01);
(Continued)

(58) Field of Classification Search
CPC ...... B60W 10/06; B60W 10/18; B60W 30/17; B60W 30/16; B60W 40/04; B60W 50/14; B60R 21/013; B60R 16/023
(Continued)

(56) References Cited

U.S. PATENT DOCUMENTS

2006/0229793 A1* 10/2006 Sawamoto ................ B60T 7/22
701/96
2010/0030397 A1*  2/2010 Tachibana ................ B62K 1/00
701/1
(Continued)

FOREIGN PATENT DOCUMENTS

CN    101101702 A    1/2008
CN    104210492 A    12/2014
(Continued)

OTHER PUBLICATIONS

International Search Report and Written Opinion dated Jun. 30, 2017 in PCT/CN2017/075087.
(Continued)

*Primary Examiner* — Tan Q Nguyen
(74) *Attorney, Agent, or Firm* — Syncoda LLC; Feng Ma (57) ABSTRACT

The present disclosure provides a vehicle-mounted automatic drive control system, its control method and a vehicle containing the vehicle-mounted automatic drive control system. The vehicle-mounted automatic drive control system comprises at least one sensor, a controller, and a drive control feedback portion. The at least one sensor is coupled to the controller. The drive control feedback portion is coupled to the controller. The at least one sensor is configured to detect at least one object in an environment of the first vehicle and to send a detection result to the controller. The controller is configured to transmit a control signal to the drive control feedback portion if the detection result satisfies a preset condition. The drive control feedback
(Continued)

portion is configured, upon receiving the control signal from the controller, to perform an operation such that the first vehicle can adjust a first driving status thereof.

19 Claims, 2 Drawing Sheets

(51) Int. Cl.
*B60W 50/14* (2012.01)
*B60W 30/09* (2012.01)
*B60W 50/16* (2012.01)
*B60W 40/04* (2006.01)
*B60R 21/013* (2006.01)

(52) U.S. Cl.
CPC ............ *B60W 50/14* (2013.01); *B60W 50/16* (2013.01); *B60W 2550/10* (2013.01); *B60W 2550/30* (2013.01); *B60W 2550/302* (2013.01); *B60W 2550/308* (2013.01)

(58) Field of Classification Search
USPC .... 701/423, 325, 300, 301, 93, 96; 340/902, 340/903, 435, 436
See application file for complete search history.

(56) References Cited

U.S. PATENT DOCUMENTS

| | | | |
|---|---|---|---|
| 2013/0144502 A1* | 6/2013 | Shida | B60K 31/0008 701/96 |
| 2013/0226432 A1* | 8/2013 | Tsuruta | B60W 30/165 701/96 |
| 2017/0082452 A1* | 3/2017 | Sumizawa | B60W 30/10 |
| 2018/0105186 A1* | 4/2018 | Motomura | B60W 50/14 |

FOREIGN PATENT DOCUMENTS

| | | |
|---|---|---|
| CN | 204077505 U | 1/2015 |
| CN | 105035071 A | 11/2015 |
| CN | 105346542 A | 2/2016 |
| CN | 105599763 A | 5/2016 |
| JP | 2004268644 A | 9/2004 |

OTHER PUBLICATIONS

1st Office Action dated Jan. 12, 2018 in CN201610438627.4.
2nd Office Action dated Sep. 4, 2018 in CN201610438627.4.

* cited by examiner

AUTOMATIC DRIVE CONTROL SYSTEM AND METHOD, AND VEHICLE

CROSS-REFERENCE TO RELATED APPLICATION

The present application claims priority to Chinese Patent Application No. 201610438627.4 filed on Jun. 17, 2016, the disclosure of which is hereby incorporated by reference in its entirety.

TECHNICAL FIELD

The present disclosure relates generally to the field of automotive control technology, and more specifically to a vehicle-mounted automatic drive control system and method, and a vehicle having the vehicle-mounted automatic drive control system.

BACKGROUND

The rapid development of the automobile industry brings a lot of convenience, as well as a series of problems such as traffic congestion, accidents, environmental pollution, and shortage of energy. The interrelationships between human beings, automobiles, and roads thus need to be harmonized.

Current advanced driver assistance systems are centered on human beings, can effectively reduce accidents caused by human beings by improving the sensing and decision-making capabilities of human beings to vehicles and roads, and can make driving more comfortable at the same time. Benefiting from information perception and vehicle control technologies, the burden of operation for the driver of the vehicle having a driver assistance system is reduced significantly.

With the dissemination of the driver assistance system technologies, traffic flow can be smoothened effectively, therefore causing a reduction of traffic congestion, fuel consumption, and emission of pollutants.

As such, the driver assistance system technology can provide an effective solution to various issues being encountered during the development of modern transportation system.

SUMMARY

In order to solve one of the technical problems in existing technologies and to improve driving safety, the present disclosure provides a vehicle-mounted automatic drive control system, its control method, and a vehicle containing the same.

In a first aspect, a vehicle-mounted automatic drive control system is disclosed, which comprises at least one sensor, a controller, and a drive control feedback portion. The at least one sensor is coupled to the controller. The drive control feedback portion is coupled to the controller. The at least one sensor is configured to detect at least one object in an environment of the first vehicle and to send a detection result to the controller. The controller is configured to transmit a control signal to the drive control feedback portion if the detection result satisfies a preset condition. The drive control feedback portion is configured, upon receiving the control signal from the controller, to perform an operation such that the first vehicle can adjust a first driving status thereof.

In some embodiments of the automatic drive control system, the drive control feedback portion is further configured to transmit a first prompting signal to at least one second vehicle such that each of the at least one second vehicle can adjust a second driving status thereof.

In some embodiments of the automatic drive control system, the at least one object that is detected by the at least one sensor can comprise a third vehicle, which is on a same driving track as, and in front of, the first vehicle. As such, the detection result can comprise at least one of a relative speed or a relative distance between the first vehicle and the third vehicle. The preset condition can comprise at least one of the following: the relative speed between the first vehicle and the third vehicle is larger than, or equal to, a first preset value, and the relative distance between the first vehicle and the third vehicle is larger than, or equal to, a second preset value. The drive control feedback portion can be configured to cause the first vehicle to start or to follow the third vehicle.

Herein the situation where the first vehicle starts can be, for example, that the first vehicle that has stopped behind the third vehicle behind a red traffic light starts the engine and picks up a speed after the traffic light has turned green and the third vehicle has moved. The situation where the first vehicle follows the third vehicle can be, for example, that the first vehicle increases its moving speed on a road to reduce the relative speed or the relative distance between the first vehicle and the third vehicle. Other situations are possible and there are no limitations herein.

In some other embodiments of the automatic drive control system, the at least one object can comprise a fourth vehicle on a same driving track as, and behind, the first vehicle. As such, the detection result can comprise at least one of a relative speed or a relative distance between the first vehicle and the fourth vehicle. The preset condition can comprise at least one of the following: the relative speed between the first vehicle and the fourth vehicle is larger than, or equal to, a first preset value, and the relative distance between the first vehicle and the fourth vehicle is larger than, or equal to, a second present value. The drive control feedback portion is configured to transmit the prompting signal to the fourth vehicle such that the fourth vehicle can start or follow the first vehicle.

In yet some other embodiments of the automatic drive control system, the at least one object can comprise an obstacle on a driving track of the first vehicle. As such, the preset condition can comprise a presence of the obstacle, and the drive control feedback portion is configured to modify a functionality of an accelerator of the first vehicle to thereby avoid crashing of the first vehicle into the obstacle.

Herein the drive control feedback portion can be configured to cancel the function of the accelerator or switch the function of the accelerator to braking, if the at least one sensor detects an obstacle if the first vehicle is moving. The drive control feedback portion can also be configured to cancel the function of the accelerator or make the accelerator hard to press down, if the first vehicle is about to move.

In the automatic drive control system as described above, the operation performed by the drive control feedback portion can comprise: sending a second prompting signal to the first vehicle such that the first vehicle can adjust the first driving status thereof; or directly adjusting the first driving status of the first vehicle.

The automatic drive control system as such can further comprise an prompting portion, which is coupled with the controller and is configured to display prompting signals. Herein the prompting signals can comprise the second prompting signal and a third prompting signal transmitted from another vehicle.

In the automatic drive control system as described above, the prompting portion can comprise at least one of the following: a vibrator, which can be disposed on a steering wheel or a driver's seat and configured to send prompting signals by vibration; an image display, which can be configured to send prompting signals by displaying images; and an audio display, which can be configured to send prompting signals by displaying audios.

The automatic drive control system as described above can further comprise a receiving portion, which is coupled with the controller and is configured to receive the third prompting signal from the another vehicle.

In some embodiments of the automatic drive control system, the at least one sensor can include a first sensor and a second sensor. The first sensor is configured to detect the at least one object behind the first vehicle; and the second sensor is configured to detect the at least one object in front of the first vehicle.

In yet some of the embodiments of the automatic drive control system as described above, the at least one sensor can further include a third sensor and a fourth sensor, which are configured to detect at least one object on two sides of the first vehicle respectively.

Herein each of the at least one sensor can be a camera, an infrared sensor, or a radar.

In a second aspect, the present disclosure provides an automatic drive control method utilizing the automatic drive control system as described above. The automatic drive control method comprises:

the at least one sensor detecting at least one object in an environment of the first vehicle and sending a detection result to the controller;

the controller transmitting a control signal to the drive control feedback portion if the detection result satisfies a preset condition; and the drive control feedback portion performing an operation such that the first vehicle can adjust a first driving status thereof.

According to some embodiments of the present disclosure, the automatic drive control method can further comprise:

the drive control feedback portion transmitting a first prompting signal to at least one second vehicle such that each of the at least one second vehicle can adjust a second driving status thereof.

In the automatic drive control method, the step where the drive control feedback portion performs an operation can comprise:

the drive control feedback portion sending a second prompting signal to the first vehicle such that the first vehicle can adjust the first driving status thereof; or the drive control feedback portion directly adjusting the first driving status of the first vehicle.

According to some embodiments of the present disclosure, the automatic drive control method further comprises:

a receiving portion obtaining, and sending to the controller, a third prompting signal from another vehicle;

the controller sending a second control signal to a prompting portion; and the prompting portion displaying the third prompting signal to the first vehicle based on the second control signal.

In some embodiments of the automatic drive control method, the at least one object comprises an obstacle on a driving track of the first vehicle, and the step where the drive control feedback portion directly adjusts the first driving status of the first vehicle comprises:

the drive control feedback portion cancelling a function of an accelerator or switching the function of the accelerator to braking, if the at least one sensor detects an obstacle if the first vehicle is moving; or the drive control feedback portion cancelling the function of the accelerator or making the accelerator hard to press down if the first vehicle is about to move.

In a third aspect, the present disclosure further provides a vehicle, which includes an automatic drive control system according to any one of the embodiments as described above.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

DETAILED DESCRIPTION

In the following, with reference to the drawings of various embodiments disclosed herein, the technical solutions of the embodiments of the disclosure will be described in a clear and fully understandable way. It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

In a first aspect, the present disclosure provides a vehicle-mounted automatic drive control system, which is mounted on a first vehicle and comprises at least one sensor and a drive control feedback portion. The at least one sensor is configured to detect at least one object in an environment of the first vehicle; and the drive control feedback portion is configured, upon the at least one sensor detecting the at least one object, to modify functionality of at least one part in the first vehicle so as to achieve an improved safety or transportation efficiency of the first vehicle.

In some embodiments, the vehicle-mounted automatic drive control system also includes a controller, and the at least one sensor and the drive control feedback portion are each coupled to the controller respectively. In a vehicle-mounted automatic drive control system as such, the at least one sensor is further configured to send a detection result to the controller; the controller is configured to transmit a control signal to the drive control feedback portion based on the detection result, and the drive control feedback portion is configured, upon receiving the control signal from the controller, to modify the functionality of the at least one part in the first vehicle.

It is noted that the controller having a function as described above does not have to be mounted on the first vehicle, but rather can be a remote controller, which can be, for example, a remote server in a cloud. In a vehicle-mounted automatic drive control system as such, the at least one sensor and the drive control feedback portion can be each coupled to the controller through a wireless communication.

Figure 1:
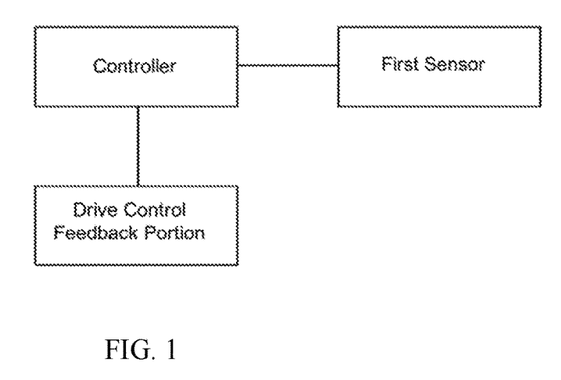
FIG. 1 is a schematic diagram of a vehicle-mounted automatic drive control system according to a first embodiment of the present disclosure.

FIG. 1 illustrates a vehicle-mounted automatic drive control system according to a first embodiment of the present disclosure. As shown in FIG. 1, the vehicle-mounted automatic drive control system comprises a first sensor, a controller, and a drive control feedback portion.

The first sensor can be mounted at a rear side of a first vehicle (i.e., a tail side of the first vehicle), and the first sensor is configured to detect a relative speed and/or a relative distance between the first vehicle and another vehicle that is behind the first vehicle (i.e. a second vehicle). It should be noted that the first sensor can also be mounted at another position (for example, on a top) of the first vehicle, as long as the first sensor can detect the relative speed and/or the relative distance between the first vehicle and the second vehicle that is behind the first vehicle.

The controller is coupled to the first sensor and is configured to compare the relative speed and/or the relative distance between the first vehicle and the second vehicle that is detected by the first sensor with a preset value that is pre-stored in the controller, and to transmit a first control signal if the relative speed and/or the relative distance between the first vehicle and the second vehicle is larger than, or equal to, the preset value.

The drive control feedback portion is coupled to the controller, and is configured, upon receiving the first control signal transmitted by the controller, to send a prompting signal to the second vehicle so as to instruct the second vehicle to start and follow the first vehicle.

Herein the first sensor of the vehicle-mounted automatic drive control system as described above can detect the relative speed and/or the relative distance between the first vehicle and the second vehicle (i.e. the vehicle that is behind the first vehicle). Thus if the detection result (i.e., the relative speed and/or the relative distance between the first vehicle and the second vehicle) of the first sensor is larger than, or equal to, the preset value that is pre-stored in the controller, the controller can send a first control signal to thereby control the drive control feedback portion to send a prompting signal to the second vehicle so as to instruct the second vehicle to start and follow the first vehicle. As such, the problem that the transportation efficiency is often negatively affected by too large distances between vehicles can be effectively relieved.

Specifically, the vehicle-mounted automatic drive control system as described above is illustrated in detail by an example where vehicles are waiting at a traffic light intersection.

When a red traffic light switches to a green traffic light, a first vehicle switches from a stationary state to a moving state, and a first sensor of the first vehicle can detect a relative distance and/or a relative speed between the first vehicle and another vehicle behind the first vehicle (i.e. a second vehicle) and can then send the detection result to a controller.

The controller can then compare the detection result by the first sensor and a preset value that is pre-stored in the controller: if the detection result is larger than, or equal to, the preset value, the controller can send a first control signal.

For example, the preset value of the relative distance can be 10 m, and the preset value of the relative speed can be 60 km/h. If the first sensor detects that the relative distance between the first vehicle and the second vehicle is 12 m, and/or the relative speed is 70 km/h, i.e., the detection result is larger than the preset value, which indicates that the second vehicle has not started moving yet, the controller can then send the first control signal. Then the drive control feedback portion can, upon receiving the first control signal, further transmit a prompting signal to the second vehicle so as to instruct the second vehicle to start and follow.

It is understandable that a receiving portion need to be mounted on the second vehicle such that a driver of the second vehicle, or the second vehicle itself, can be reminded upon receiving the prompting signal from the first vehicle to thereby allow the second vehicle to follow the first vehicle.

In some embodiments of the present disclosure, the first sensor can further be configured to detect whether there is an obstacle on the road when the first vehicle stops: if the first sensor detects that there is an obstacle behind the first vehicle, the controller can send a second control signal to the drive control feedback portion, and the drive control feedback portion can then render an accelerator of the first vehicle ineffective or hard to press down according to the second control signal to instruct the driver of the first vehicle.

Herein the aforementioned obstacle can be a pedestrian behind the first vehicle, a bump, or a wall, etc. The environment where the vehicle stops can be a parking lot or a roadside, etc.

Specifically in one example, where a first vehicle parking at a parking lot prepares to back out of the parking lot, when a driver of the first vehicle starts the first vehicle, if a first sensor detects that there is an obstacle behind the first vehicle, the controller sends a second control signal to a drive control feedback portion so as to render an accelerator of the first vehicle ineffective or difficult to press down to thereby instruct a driver of the first vehicle. As such, the driving safety can be improved and accidents can be effectively prevented from happening.

Herein the first sensor can be any one of a camera, an infrared sensor, a radar, or a sensing device that can detect speed and distance. There are no limitations herein.

Figure 2:
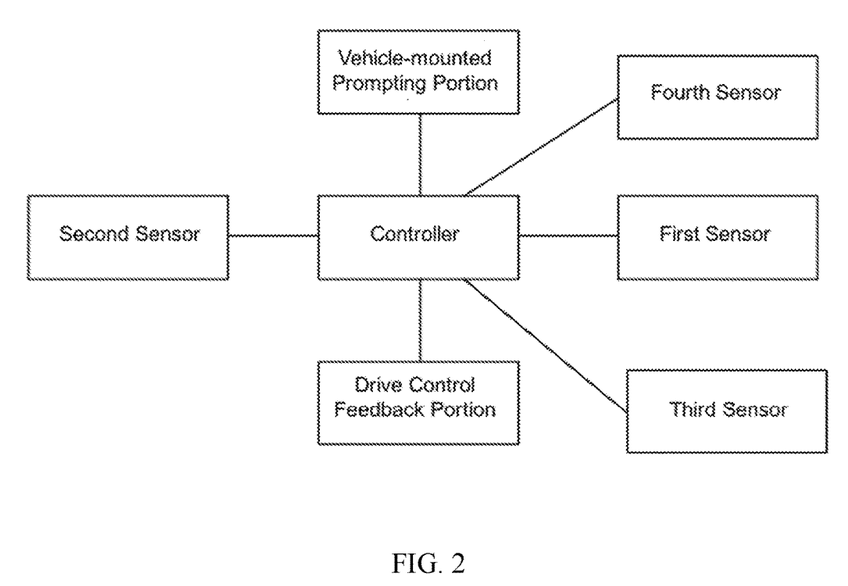
FIG. 2 is a schematic diagram of a vehicle-mounted automatic drive control system according to a second embodiment of the present disclosure.

FIG. 2 illustrates a vehicle-mounted automatic drive control system according to a second embodiment of the present disclosure. As shown in FIG. 2, in addition to a first sensor, a controller, and a drive control feedback portion, which are illustrated in the first embodiment as shown in FIG. 1, the vehicle-mounted automatic drive control system in the second embodiment further includes a second sensor and a vehicle-mounted prompting portion.

The second sensor can be mounted at a front side (i.e. a head side) of a first vehicle. Based on a system for Internet of Vehicles, where the second sensor of the vehicle-mounted automatic drive control system of the first vehicle can be coupled, or communicatively connected, to a first sensor of another vehicle in front of the first vehicle (i.e. a third vehicle). The second sensor and the vehicle-mounted prompting portion are respectively coupled to the controller.

The second sensor of the first vehicle is configured to receive a prompting signal sent by the first sensor of the third vehicle. Herein the prompting signal is generated by a vehicle-mounted automatic drive control system mounted on the third vehicle (i.e. the vehicle in front of the first vehicle), wherein upon the first sensor of the third vehicle detecting that the relative speed and/or the relative distance between the third vehicle and the first vehicle is larger than, or equal to, a preset value, a controller of the third vehicle controls a drive control feedback portion of the third vehicle to transmit the prompting signal to the first vehicle such that the first vehicle can start and follow the third vehicle.

In this process, the controller of the first vehicle is configured to send out a third control signal upon receiving the prompting signal, and the vehicle-mounted prompting portion of the first vehicle is configured to instruct the driver of the first vehicle, or the first vehicle itself, to follow according to the third control signal.

As such, the second sensor of the vehicle-mounted automatic drive control system of the first vehicle can receive the prompting signal transmitted from the third vehicle (i.e. the vehicle in front of the first vehicle) for reminding the first vehicle to follow the third vehicle. Thus the problem that too large distances between vehicles lower the transportation efficiency can be effectively relieved.

Herein the vehicle-mounted prompting portion can comprise an instruction display portion, a vibration portion disposed on a steering wheel, a voice prompting portion, or an instruction device that can instruct the driver. There are no limitations herein.

In some embodiments of the present disclosure, the second sensor can be further configured to detect whether there is a change in the relative speed and/or the relative distance between the third vehicle and the first vehicle when the first vehicle stops: if the second sensor detects that there is a change in the relative speed and/or the relative distance between the third vehicle and the first vehicle, the controller of the first vehicle can send a fourth control signal, and the drive control feedback portion of the first vehicle can then control the first vehicle to follow the third vehicle automatically according to the fourth control signal.

Specifically, the aforementioned embodiment is illustrated by a situation where vehicles are waiting at a traffic light intersection.

After a red traffic light is changed to a green traffic light, the third vehicle (i.e. the vehicle in front of the first vehicle) starts and moves earlier than the first vehicle. If the second sensor of the vehicle-mounted automatic drive control system on the first vehicle detects that there is a change in the relative speed and/or the relative distance between the third vehicle and the first vehicle, which indicates that the third vehicle has already started and moved, the controller on the first vehicle can send the fourth control signal, and the drive control feedback portion can then control the first vehicle to follow automatically according to the fourth control signal. As such, vehicles can achieve an automatic following to thereby be able to reduce the distances between vehicles, resulting in an improved transportation efficiency.

In some embodiments of the present disclosure, the second sensor can further be configured to detect an obstacle on the road ahead of the first vehicle when the first vehicle is moving: if the second sensor detects that there is an obstacle on the road ahead of the first vehicle, the controller can send a fifth signal to the drive control feedback portion, and the drive control feedback portion can in turn control the first vehicle to cancel an acceleration function, or to switch the acceleration function into a braking function, according to the fifth control signal.

Herein the obstacle can be a pedestrian, a bump, or a wall, etc., that is ahead of the first vehicle. Specifically, if the second sensor detects that there is an obstacle (e.g. a pedestrian appearing suddenly) on the road ahead, the controller can send the fifth control signal to control the drive feedback portion to render an accelerator ineffective, or change the accelerator from accelerating to braking. As such mishandling of the accelerator and the brake by the driver under emergencies can be effectively prevented, maximally ensuring the safety of driver and people outside the vehicles.

In some embodiments of the present disclosure, in a way similar to the first sensor as described above in the first embodiment, the second sensor can be further configured to detect whether there is an obstacle on the road ahead of the first vehicle when the first vehicle stops: if the second sensor detects that there is an obstacle on the road ahead, a sixth control signal is sent out by the controller, and the drive control feedback portion can then render the accelerator of the first vehicle ineffective or difficult to press down according to the sixth control signal to thereby instruct the driver on the first vehicle.

Herein the obstacle can be a pedestrian, a bump, or a wall, etc., that is ahead of the first vehicle. The environment where the vehicle stops can be a parking lot, or a roadside, etc.

Specifically in one example, where a first vehicle parking in a parking lot prepares to move forward to thereby get out of the parking lot, when a driver starts the first vehicle, if the second sensor detects that there is an obstacle in front of the first vehicle, the controller sends the sixth control signal to control the drive control feedback portion to render the accelerator ineffective or difficult to press down to thereby instruct the driver. As such, the driving safety can be improved and accidents can be effectively prevented from happening.

Specifically in situations where the first vehicle stops (for example, at a roadside or in a parking lot), the driver prepares to start the first vehicle. If the second sensor detects a first obstacle, such as another vehicle, a pedestrian, or a wall appearing on the road ahead, and/or the first sensor detects a second obstacle, such as a vehicle, a pedestrian, and a wall appearing on the road behind, the controller can send a control signal (i.e. a sixth control signal upon detection of the first obstacle by the second sensor, or a second control signal upon detection of the second obstacle by the first sensor), and the drive control feedback portion can render the accelerator ineffective or difficult to press down under the control of the control signal to thereby instruct the driver.

The following is an illustrating example.

Figure 3:
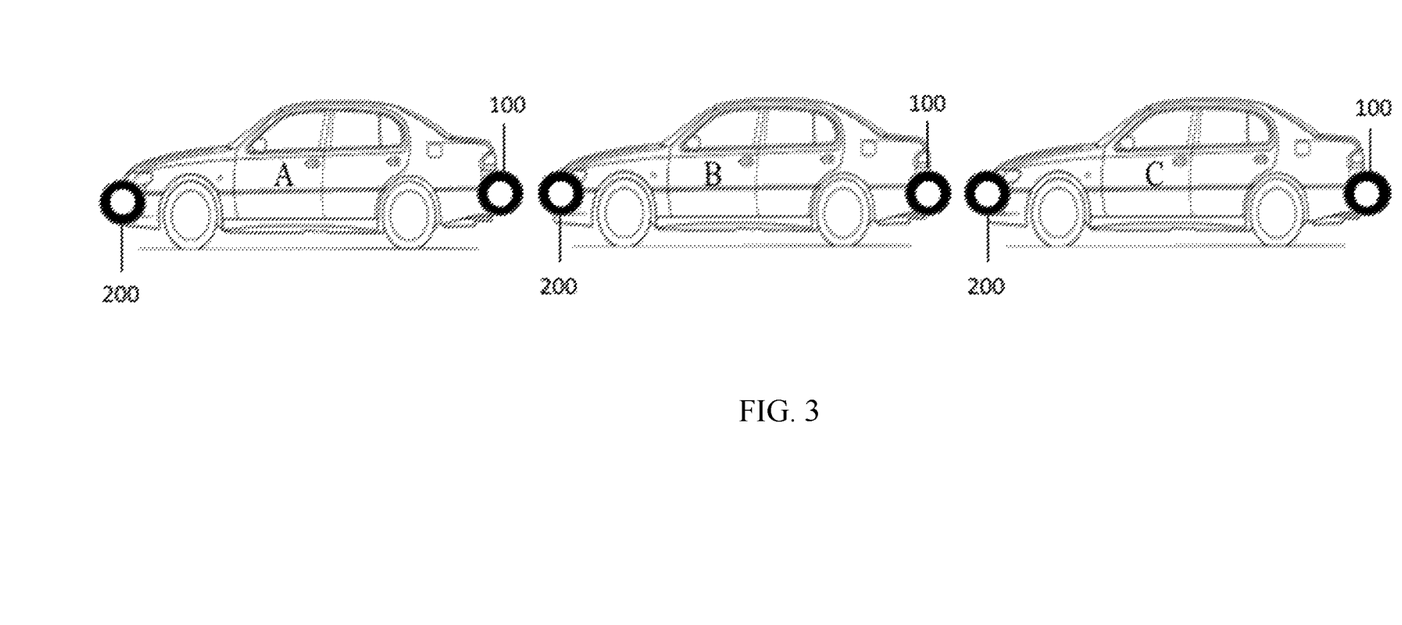
FIG. 3 is a diagram illustrating a cooperated movement of vehicles each having a vehicle-mounted automatic drive control system according to the second embodiment of the present disclosure.

As shown in FIG. 3, a vehicle-mounted automatic drive control system as described above is mounted respectively in vehicles A, B, and C, and is coupled, or communicatively connected, to one another via a system for Internet of Vehicles.

When vehicle A starts and accelerates, a first sensor 100 in the vehicle-mounted automatic drive control system that is mounted at a rear side of vehicle A can detect a distance between it and vehicle B that is immediately behind vehicle A in real time. If a change in the distance between it and vehicle B is detected, under the control of a controller in vehicle A, a prompting signal is sent by a drive control feedback portion in vehicle A to a vehicle-mounted prompting portion on vehicle B and a vehicle-mounted prompting portion on vehicle C. The vehicle-mounted prompting portion on vehicle B can instruct the driver of vehicle B to follow, whereas the vehicle-mounted prompting portion on vehicle C can instruct the driver of vehicle C of performing preparing-to-move operations such as engine ignition or release of the hand brake.

Alternatively when vehicle A starts and accelerates, a second sensor 200 in the vehicle-mounted automatic drive control system mounted on a front side of vehicle B detects a distance between it and the vehicle A. If a change is detected, a controller in vehicle B sends a fourth control signal, and a drive control feedback portion in vehicle B controls vehicle B to start and follow vehicle A upon receiving the fourth control signal. When the second sensor 200 in vehicle B detects that vehicle A has started and accelerated, the controller in vehicle B can also send a control signal to a vehicle-mounted prompting portion in vehicle B, which then reminds the driver of vehicle B to follow. At the same time, the drive control feedback portion on vehicle B can send a prompting signal to a vehicle-mounted prompting portion on vehicle C, which in turn can instruct the driver of vehicle C of performing preparing-to-move operations such as engine ignition or release of the hand brake.

Vehicle B and vehicle C can also be controlled to follow and move forward orderly through a system for Internet of Vehicles. The vehicles are originally moving on the road. If vehicle A suddenly stops, the information regarding vehicle A's sudden stop can be obtained by a sensor (i.e. the first sensor 100) disposed on the rear side of vehicle A or a sensor (the second sensor 200) disposed on the front side of vehicle B, and can then be passed to vehicle C in advance through the system for Internet of Vehicles, thereby allowing the driver of vehicle C to apply a brake in advance, or alternatively allowing a vehicle-mounted automatic drive control system as described above to automatically apply the brake in advance, to thereby maintain a suitable speed. As such, serious traffic accidents such as vehicle collisions can be effectively prevented, and the driving safety can be effectively enhanced.

In some embodiments of the present disclosure, the vehicle-mounted automatic drive control system can further comprise a third sensor and a fourth sensor. The third sensor can be mounted at a left-side door of the first vehicle and is configured to detect a road status of at least one left lane in real time. The fourth sensor can be mounted at a right-side door of the first vehicle, and is configured to detect the road status of at least one right lane in real time. The vehicle-mounted automatic drive control system as such is especially suitable for the situation such as lane changing.

Specifically, when a vehicle is changing lanes, the third sensor and the fourth sensor of the vehicle-mounted automatic drive control system can detect the traffic condition of the lane to be merged onto in real time: if any of the third sensor and the fourth sensor detects that there is a vehicle ahead or behind that will merge onto the lane on which the vehicle is moving, the controller can control the vehicle-mounted prompting portion to instruct the driver to adopt an operation such as speed reduction to thereby allow the vehicle to merge onto the lane safely.

Herein the manner in which the vehicle-mounted prompting portion reminds the driver can be any method that can effectively give feedback and instruct the driver, such as steering wheel vibration, vehicle-mounted display, accelerator response or brake response.

The first sensor, the second sensor, the third sensor, and the fourth sensor as described above can be any one of a camera, an infrared sensor, a radar, or another type of a sensing device that can detect speed and distance.

Take the above together, the vehicle-mounted automatic drive control system as described above not only can improve the driving safety but also can reduce the traffic congestion.

In a second aspect, a method for controlling the vehicle-mounted automatic drive control system according to any of the embodiments as described above is further provided herein.

The method comprises the following steps:
detecting a relative speed and/or a relative distance between a first vehicle and a second vehicle, wherein the second vehicle is immediately behind the first vehicle;
a controller sending a first control signal if the relative speed and/or the relative distance between the first vehicle and the second vehicle is larger than, or equal to, a preset value; and
the controller sending a prompting signal to the second vehicle according to the first control signal to thereby instruct the second vehicle to follow.

Specifically, the method as described above is illustrated by an example where vehicles are waiting at a traffic light intersection.

When a red traffic light is changed into a green traffic light, a first vehicle switches from a stationary state to a moving state, and a first sensor of the first vehicle can detect a relative distance and/or a relative speed between the first vehicle and a vehicle behind the first vehicle (i.e. a second vehicle), and can send a detection result to a controller. The controller can then compare the detection result of the first sensor and a preset value that is pre-stored in the controller. If the detection result is larger than, or equal to, the preset value, the controller can send a first control signal.

In one example, the preset value for the relative distance is 10 m, and the preset value for the relative speed is 60 km/h. If the first sensor detects that the relative distance between the first vehicle and the second vehicle is 12 m, and/or the relative speed is 70 km/h (i.e., the detection result is larger than the preset value), it indicates that the second vehicle may not have been started. At this moment, the controller can send the first control signal.

A drive control feedback portion can, upon receiving the first control signal, in turn send a prompting signal to the second vehicle to thereby instruct the second vehicle to start and follow the first vehicle.

It should be noted that a receiving portion that can receive the prompting signal should be installed in the second vehicle, so that a driver of the second vehicle can be reminded, or a prompting signal is given to the second vehicle, so that the second vehicle can follow automatically.

In this embodiment of the method for controlling a vehicle-mounted automatic drive control system, the first sensor can detect the relative speed and/or the relative distance between the first vehicle and the second vehicle (i.e. the vehicle behind the first vehicle). If the detection result of the first sensor is larger than or equal to the preset value pre-stored in the controller, the controller sends the first control signal to the drive control feedback portion, which in turn sends the prompting signal to the second vehicle to thereby instruct the second vehicle to start and follow. As such, the problem that too large distances between vehicles lower the transportation efficiency can be effectively relieved.

In a third aspect, the present disclosure further provides a vehicle, which comprises the vehicle-mounted automatic drive control system according to any of the embodiments as described above.

Because the vehicle as described above comprises the aforementioned vehicle-mounted automatic drive control system, the problem that too large distances between vehicles lower the transportation efficiency can be effectively relieved and the driving safety can be effectively improved.

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An automatic drive control system, mounted on a first vehicle and comprising:
    at least one sensor;
    a controller; and
    a drive control feedback portion;
    wherein:
        the at least one sensor is coupled to the controller;
        the drive control feedback portion is coupled to the controller;
        the at least one sensor is configured to detect at least one object in an environment of the first vehicle and to send a detection result to the controller;
        the controller is configured to transmit a control signal to the drive control feedback portion if the detection result satisfies a preset condition;
        the drive control feedback portion is configured, upon receiving the control signal from the controller, to perform an operation such that the first vehicle can adjust a first driving status thereof; and
        the drive control feedback portion is further configured to transmit a first prompting signal to at least one second vehicle such that each of the at least one second vehicle can adjust a second driving status thereof.

2. The automatic drive control system of claim 1, wherein:
    the at least one object comprises a third vehicle on a same driving track as, and in front of, the first vehicle;
    the detection result comprises at least one of a relative speed or a relative distance between the first vehicle and the third vehicle,
    the preset condition comprises at least one of:
        the relative speed between the first vehicle and the third vehicle is larger than, or equal to, a first preset value; or
        the relative distance between the first vehicle and the third vehicle is larger than, or equal to, a second preset value;
    and
    the drive control feedback portion is configured to cause the first vehicle to start or to follow the third vehicle.

3. The automatic drive control system of claim 1, wherein:
    the at least one object comprises a fourth vehicle on a same driving track as, and behind, the first vehicle;
    the detection result comprises at least one of a relative speed or a relative distance between the first vehicle and the fourth vehicle;
    the preset condition comprises at least one of:
        the relative speed between the first vehicle and the fourth vehicle is larger than, or equal to, a first preset value; and
        the relative distance between the first vehicle and the fourth vehicle is larger than, or equal to, a second present value;
    and
    the drive control feedback portion is configured to transmit the prompting signal to the fourth vehicle such that the fourth vehicle can start or follow the first vehicle.

4. The automatic drive control system of claim 1, wherein:
    the at least one object comprises an obstacle on a driving track of the first vehicle;
    the preset condition comprises a presence of the obstacle; and
    the drive control feedback portion is configured to modify a functionality of an accelerator of the first vehicle to thereby avoid crashing of the first vehicle into the obstacle.

5. The automatic drive control system of claim 4, wherein the drive control feedback portion is configured to cancel the function of the accelerator or switch the function of the accelerator to braking, if the at least one sensor detects an obstacle if the first vehicle is moving.

6. The automatic drive control system of claim 4, wherein the drive control feedback portion is configured to cancel the function of the accelerator or make the accelerator hard to press down, if the first vehicle is about to move.

7. The automatic drive control system of claim 1, wherein the operation performed by the drive control feedback portion comprises:
    sending a second prompting signal to the first vehicle such that the first vehicle can adjust the first driving status thereof; or
    directly adjusting the first driving status of the first vehicle.

8. The automatic drive control system of claim 1, wherein each of the at least one sensor is a camera, an infrared sensor, or a radar.

9. The automatic drive control system of claim 1, wherein the at least one sensor comprises:
    a first sensor, configured to detect the at least one object behind the first vehicle; and
    a second sensor, configured to detect the at least one object in front of the first vehicle.

10. The automatic drive control system of claim 9, wherein the at least one sensor further comprises a third sensor and a fourth sensor, configured to detect at least one object on two sides of the first vehicle respectively.

11. An automatic drive control method utilizing the automatic drive control system according to claim 1, comprising:
    the at least one sensor detecting at least one object in an environment of the first vehicle and sending a detection result to the controller;
    the controller transmitting a control signal to the drive control feedback portion if the detection result satisfies a preset condition; and
    the drive control feedback portion performing an operation such that the first vehicle can adjust a first driving status thereof.

12. The automatic drive control method according to claim 11, further comprising:
    the drive control feedback portion transmitting a first prompting signal to at least one second vehicle such that each of the at least one second vehicle can adjust a second driving status thereof.

13. The automatic drive control method according to claim 11, wherein the drive control feedback portion performing an operation comprises:
    the drive control feedback portion sending a second prompting signal to the first vehicle such that the first vehicle can adjust the first driving status thereof; or
    the drive control feedback portion directly adjusting the first driving status of the first vehicle.

14. A vehicle, comprising an automatic drive control system according to claim 1.

15. An automatic drive control system, mounted on a first vehicle and comprising:
- at least one sensor;
- a controller; and
- a drive control feedback portion;
- wherein:
  - the at least one sensor is coupled to the controller;
  - the drive control feedback portion is coupled to the controller;
  - the at least one sensor is configured to detect at least one object in an environment of the first vehicle and to send a detection result to the controller;
  - the controller is configured to transmit a control signal to the drive control feedback portion if the detection result satisfies a preset condition;
  - the drive control feedback portion is configured, upon receiving the control signal from the controller, to perform an operation such that the first vehicle can adjust a first driving status thereof; and
- the operation performed by the drive control feedback portion comprises:
  - sending a second prompting signal to the first vehicle such that the first vehicle can adjust the first driving status thereof; or
  - directly adjusting the first driving status of the first vehicle;
- the system further comprising a prompting portion, wherein:
  - the prompting portion is coupled with the controller, and is configured to display prompting signals, wherein the prompting signals comprise the second prompting signal and a third prompting signal transmitted from another vehicle.

16. The automatic drive control system of claim 15, wherein the prompting portion comprises at least one of:
- a vibrator, disposed on a steering wheel or a driver's seat and configured to send prompting signals by vibration;
- an image display, configured to send prompting signals by displaying images; and
- an audio display, configured to send prompting signals by displaying audios.

17. The automatic drive control system of claim 15, further comprising a receiving portion, wherein the receiving portion is coupled with the controller, and is configured to receive the third prompting signal from the another vehicle.

18. An automatic drive control method utilizing an automatic drive control system, mounted on a first vehicle and comprising:
- at least one sensor;
- a controller; and
- a drive control feedback portion;
- wherein:
  - the at least one sensor is coupled to the controller;
  - the drive control feedback portion is coupled to the controller;
  - the at least one sensor is configured to detect at least one object in an environment of the first vehicle and to send a detection result to the controller;
  - the controller is configured to transmit a control signal to the drive control feedback portion if the detection result satisfies a preset condition; and
- the drive control feedback portion is configured, upon receiving the control signal from the controller, to perform an operation such that the first vehicle can adjust a first driving status thereof;
- the method comprising:
  - the at least one sensor detecting at least one object in an environment of the first vehicle and sending a detection result to the controller;
  - the controller transmitting a control signal to the drive control feedback portion if the detection result satisfies a preset condition;
  - the drive control feedback portion performing an operation such that the first vehicle can adjust a first driving status thereof;
  - a receiving portion obtaining, and sending to the controller, a third prompting signal from another vehicle;
  - the controller sending a second control signal to a prompting portion; and
  - the prompting portion displaying the third prompting signal to the first vehicle based on the second control signal.

19. The automatic drive control method according to claim 13, wherein the at least one object comprises an obstacle on a driving track of the first vehicle, and the drive control feedback portion directly adjusting the first driving status of the first vehicle comprises:
- the drive control feedback portion cancelling a function of an accelerator or switching the function of the accelerator to braking, if the at least one sensor detects an obstacle if the first vehicle is moving; or
- the drive control feedback portion cancelling the function of the accelerator or making the accelerator hard to press down if the first vehicle is about to move.

* * * * *